United States Patent Office 3,057,875
Patented Oct. 9, 1962

---

3,057,875
SUBSTITUTED 2-METHYLENE-4,5-DICYANO-1,3-DITHIOLEN COMPOUNDS
Morton Brown, Wilmington, Del., assignor to E. I. du Pont de Nemours and Company, Wilmington, Del., a corporation of Delaware
No Drawing. Filed Apr. 25, 1960, Ser. No. 24,234
5 Claims. (Cl. 260—327)

This invention relates to new and useful derivatives of 1,3-dithiolene 1,3-dithiolene has the formula (1) 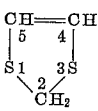

where the numbers within the ring indicate the numbers assigned to the annular atoms. This compound, which has also been called 1,3-dithiole, 1,3-disulfole and 1,3-dithia-4-cyclopentene (see the Ring Index, by Patterson and Capell, 1940), has received little attention and few derivatives of it are known.

The new 1,3-dithiolene derivatives of this invention are substituted 2-methylene-4,5-dicyano-1,3-dithiolenes characterized by the generic formula (2) 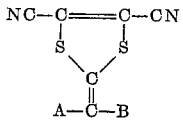

wherein A and B, when taken individually, constitute monovalent groups which are attached to the methylene carbon shown in Formula 2 through a polyvalent atom, this atom being part of the monovalent group, which in turn is attached to another atom by a multiple bond; and wherein A and B can be united to form a divalent group, each terminal atom of which is united to the methylene carbon through a polyvalent atom, at least one of which in turn is attached to another atom by a multiple bond. A preferred class of compounds within Formula 2 are those wherein A and B are united to the methylene carbon through a polyvalent atom of the group C, N, and S, are the same or different, and are selected from the group consisting of —CN, —COOR, —SO$_2$R, —SO$_2$NR$_2$, —CONH$_2$, —CONHR, —CONR$_2$, —COR; A and B together can form a divalent radical selected from the group consisting of —CO—R'—CO—, e.g., —CO—(CH$_2$)$_3$—CO— and

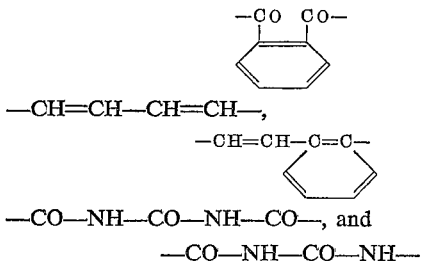

—CH=CH—CH=CH—,
—CH=CH—C=C—

—CO—NH—CO—NH—CO—, and
—CO—NH—CO—NH—

In this preferred class R and R' are monovalent and divalent hydrocarbon groups free of non-aromatic unsaturation (i.e., in which any unsaturation is aromatic) of up to 7 carbons (i.e., 1 through 7 carbons) each.

The products of this invention can be prepared by reacting a 1,2-dihalo-1,2-dicyanoethylene with a salt of a 1,1-dimercapto-2,2-disubstituted ethylene. This reaction and the structural formulas of the reactants can be represented as follows:

(3) 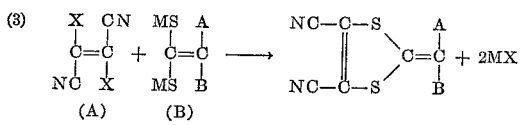

In Equation No. 3 (supra) X in Formula A is a halogen atom, i.e., fluorine, chlorine or bromine, but preferably chlorine. Similarly, in Equation 3 M in Formula B represents an alkali metal or an alkyl substituted ammonium cation. A and B in this latter formula are as defined above.

Of the cationic salts of 1,1-dimercapto-2,2-disubstituted ethylenes represented by Formula B, triethylammonium, sodium and potassium salts are typical preferred examples.

In general, the 1,2-dihalo-1,2-dicyanoethylene and the 1,1-dimercapto-2,2-disubstituted ethylene salts are simply contacted in a conventional reaction vessel. Elevated or reduced temperatures are not critical factors in the process, but the reaction seems to produce the best yields at temperatures from about −10 to 30° C. However, temperatures as low as about −80° C. or as high as about 100° C., or even higher, can be used.

The reaction time can be varied between wide limits. In a batch process it is generally between about 10 minutes and 24 hours. The time can be varied inversely with both the temperature and the reactivity of the reactants.

For convenience, the processes are conducted at atmospheric pressures, but pressures above or below atmospheric can be used.

Mole ratios of reactants are also not critical, but in a preferred process the two reactants are used in a 1:1 mole ratio as the stoichiometry of Equation 3 above suggests. However, an excess of either reactant can be used when and if desired.

In preparing the products of this invention an excess of free alkali or alkaline reagent should be avoided. This precaution is especially important in those instances where salts of 1,1-dimercapto-2,2-disubstituted ethylenes are used without isolation from the reaction medium in which they are made.

It is preferred to conduct the processes in an inert preferably organic liquid reaction medium, i.e., in a medium which is inert to reactants and products under the particular reaction conditions chosen. Suitable media include such commonly available materials as tetrahydrofuran, ethanol, methanol, diethyl ether, 1,2-dimethoxyethane, dioxane, acetonitrile, dimethyl sulfoxide, ethyl acetate, benzene, cyclohexane, and dimethylformamide. Other suitable reaction media will be readily apparent to those skilled in the art.

After the reaction between reactants is complete, or nearly so, the desired substituted 2-methylene-4,5-dicyano-1,3-dithiolene is separated from the reaction mixture by conventional means and similarly purified to the extent desired.

The compounds thus obtained are in general yellow, crystalline, high-melting substances with strong absorption in the ultraviolet region above 300 mμ.

The 1,2-dihalo-1,2-dicyanoethylenes of Formula 3 (A) useful in the processes of preparing the compounds of this invention can be prepared by any conventional means. For example, 1,2-dichloro-1,2-dicyanoethylene can be prepared as described in U.S. Patent 2,443,494, and it can be used in either the cis-form (dichloromaleonitrile) or in the transform (dichlorofumaronitrile) or as a mixture of both cis- and trans-form.

Similarly, salts of 1,1-dimercapto-2,2-disubstituted ethylenes can be prepared by any conventional means known to the art. Especially practical salts are the disodium and dipotassium salts which can readily be prepared by slightly varying the methods described in U.S. Patents 2,493,071 and 2,533,233 which involve the reaction of carbon disulfide and the appropriate active methylene compound in alcoholic base. This reaction can be represented as follows:

(4)
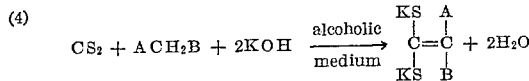

Active methylene compounds, represented by ACH$_2$B wherein A and B are defined as above, used in this reaction are illustrated by malononitrile, diethyl malonate, ethyl cyanoacetate, ethyl acetoacetate, acetylacetone, ethyl benzoylacetate, benzoylacetanilide, benzoylacetonitrile, benzenesulfonylacetonitrile, carbethoxyacetamide, α-cyanoacetanilide, dibenzoylmethane, and bis(phenylsulfonyl) methane.

This invention is illustrated more explicitly by the following examples in which weights are given in grams unless otherwise specified and melting points are not corrected.

EXAMPLE I

*Dipotassium 1,1-Dimercapto-2,2-Dicyanoethylene*

Dipotassium 1,1-dimercapto-2,2-dicyanoethylene, $$(KS)_2C=C(CN)_2$$

is produced as illustrated in general Equation 4 by the following procedure:

In a one-liter, three-necked flask fitted with a stirrer, thermometer, and dropping funnel is placed a solution of 60 g. of potassium hydroxide in 650 ml. of denatured ethyl alcohol. The solution is cooled to 0° in an ice-salt bath and 35.4 g. (0.536 mole) of freshly distilled malononitrile is added all in one portion followed by the dropwise addition of 41 g. (0.54 mole) of carbon disulfide at 0–10° C. Toward the end of the addition, a canary-yellow salt begins to precipitate. After stirring for one hour more at 0–5° C., the solid is collected on a filter and washed with 50 ml. of cold ethanol. After drying to constant weight at <0.1 mm. and 80° C., there is obtained 109 g. (94% of the theoretical yield) of a yellow, water-soluble salt which does not melt below 250° C. This product is dipotassium 1,1-dimercapto-2,2-dicyanoethylene and is of sufficient purity for subsequent reactions.

*Analysis.*—Calcd. for C$_4$N$_2$S$_2$K$_2$: C, 22.0; S, 29.4. Found: C, 21.76; S, 29.23.

The ultraviolet spectrum had $$\lambda_{max.}^{H_2O} \ 343 \ m\mu \ (k=48)$$

and a shoulder at 215 mμ (k=28). The infrared had absorption at 4.5μ (conjugated CN) and 6.30μ (C=C).

EXAMPLE II

*2-Dicyanomethylene-4,5-Dicyano-1,3-Dithiolene*

2-Dicyanomethylene-4,5-dicyano-1,3-dithiolene,

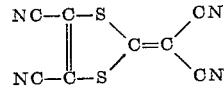

is produced as illustrated in general Equation 3 by the following procedure. Ninety-four grams of dipotassium 1,1-dimercapto-2,2-dicyanoethylene (0.43 mole) prepared as described in Example I is suspended in 500 ml. of dry tetrahydrofuran in a flask protected with calcium chloride drying tubes and cooled to 0° C. in an ice-salt bath. Dichlorofumaronitrile (49.5 g., 0.336 mole) is added in one portion and the temperature rises to 15–20° C. in a few minutes. The reddish-orange solution becomes black on stirring overnight. After filtration, the filtrate is evaporated under reduced pressure leaving a gummy black residue. The residue is extracted with four 200-ml. portions of boiling toluene. The combined extracts are treated with decolorizing carbon and concentrated to 100 ml. Cooling produces 36 g. (50%) of bright yellow crystals melting at 161-170° C. with decomposition. Three recrystallizations from toluene afford 2 - dicyanomethylene - 4,5 - dicyano - 1,3-dithiolene melting at 203-206° C. with slight decomposition.

*Analysis.*—Calcd. for C$_2$N$_4$S$_8$: C, 44.43; N, 25.93; S, 29.64. Found: C, 44.68; N, 2570; S, 30.00.

The infrared spectrum shows absorption at 4.48μ (conjugated CN), 6.48μ, 6.67μ, and 7.73μ. The ultra-violet spectrum show $$\lambda_{max.}^{CH_2Cl_2} \ 237 \ m\mu \ (k=43.5)$$

283 mμ (k=20.9), 355 mμ (k=89.0), and 367 mμ (k=81).

EXAMPLE III

To a solution of 2.50 g. (0.0115 mole) of dipotassium 1,1-dimercapto-2,2-dicyanoethylene in 50 ml. of methanol is added in one lot 1.47 g. (0.01 mole) of dichlorofumaronitrile at room temperature. After stirring for 15 minutes, the reaction mixture is poured into 300 ml. of water and the solid which precipitates is collected on a filter (1.12 g.). Recrystallization from hot toluene after treatment with decolorizing carbon yields 0.99 g. of yellow needles, M.P. 208–209° C. This is shown by elementary analysis and absorption spectra to be 2-dicyanomethylene-4,5-dicyano-1,3-dithiolene.

*Analysis.*—Calcd. for C$_8$N$_4$S$_2$: C, 44.43; S, 29.64. Found: C, 43.97; S, 30.01.

The infrared spectrum shows absorption at 4.5μ, 6.50μ, 6.85μ, and 8.45μ. The ultraviolet spectrum shows $$\lambda_{max.}^{CH_2Cl_2} \ 241 \ m\mu \ (k=56)$$

328 mμ (k=64.3), 344 mμ (k=73.2), and 355 mμ (k=71.3).

EXAMPLE IV

To a mixture of 6.6 g. (0.1 mole) of malononitrile, 20.0 g. (0.2 mole) of triethylamine, and 75 ml. of methanol is added slowly 7.6 g. (0.1 mole) of carbon disulfide while the mixture is cooled in an ice bath. The mixture is stirred 15 minutes and 14.7 g. (0.1 mole) of dichlorofumaronitrile is added in small batches over 30 minutes. The mixture is stirred an additional 30 minutes and then diluted with 100 ml. of water and allowed to stand 15 minutes. Filtration gives 23 g. (wet) of black filter cake. Extraction of this residue with hot toluene and treatment with decolorizing carbon yields 8.7 g. of product, M.P. 176–179° C. The infrared spectrum shows this material to be largely 2-dicyanomethylene-4,5-dicyano-1,3-dithiolene. Trituration of the above material with hot methanol yields two fractions:

(a) Methanol insoluble, weight, 3.4 g., light yellow crystals, M.P. 205–208° C. whose infrared absorption spectra show it to be identical with 2-dicyanomethylene-4,5-dicyano-1,3-dithiolene, and (b) The methanol-soluble portion which, after crystallization from methanol, weighs 3.1 g., M.P. 192–198° C., and is shown by infrared analysis to be largely 2-dicyanomethylene-4,5-dicyano-1,3-dithiolene.

EXAMPLE V

*2-(Cyanocarboethoxymethylene)-4,5-Dicyano-1,3-Dithiolene*

Example I is repeated using ethyl cyanoacetate instead of malononitrile to give dipotassium 1,1-dimercapto-2-cyano-2-carboethoxyethylene which is a light yellow solid having no melting point below 250° C.

*Analysis.*—Calcd. for C$_6$H$_5$NO$_2$S$_2$K$_2$: C, 27.21; H, 1.90; N, 5.28; S, 24.10. Found: C, 27.34, 27.24; H, 1.95, 1.80; N, 5.37, 5.51; S, 23.88, 24.01.

The infrared spectrum shows bands at 4.5μ (conjugated CN), 6.0μ (conjugated $CO_2C_2H_5$), and 6.35μ (C=C).

2-(cyanocarboethoxymethylene)-4,5-dicyano-1,3-dithiolene is synthesized in 66% yield in a manner similar to that of Example II using the above dipotassium 1,1-dimercapto-2-cyano-2-carboethoxyethylene with dichlorofumaronitrile as the reactants and 1,2-dimethoxyethane as the reaction solvent. It is a faintly yellow crystalline solid and melts at 137–139° C. after recrystallization from hexane-benzene.

*Analysis.*—Calcd. for $C_{10}H_5N_3S_2O_2$: C, 45.70; H, 1.90; N, 15.96; S, 24.35. Found: C, 45.49, 45.80; H, 1.88, 1.77; N, 16.16; S, 24.30.

The ultraviolet spectrum shows

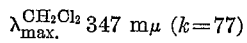

with a shoulder at 230mμ ($k$=41.9). In the infrared region, it shows absorption at 3.35μ, 4.50μ, 5.93μ, 6.46μ, 6.75μ, and 7.25μ.

EXAMPLE VI

2-(Cyanocarboxamidomethylene)-4,5-Dicyano-1,3-Dithiolene

Example I is repeated using cyanoacetamide instead of malononitrile to give, after drying to constant weight at 80° C. at <1 mm. pressure, 73% of the theoretical yield of dipotassium 1,1-dimercapto-2-cyano-2-carboxamidoethylene, a bright yellow solid which did not melt but decomposed at about 250° C.

Dipotassium 1,1-dimercapto-2-cyano-2-carboxamidoethylene is treated with dichlorofumaronitrile according to the procedure of Example II to give 95% of the theoretical yield of a yellow solid, 2-(cyanocarboxamidomethylene)-4,5-dicyano-1,3-dithiolene, melting at 288–295° C. (decomp.). Three crystallizations of this product from a mixture of acetone and tetrahydrofuran gave a 73% yield of fine yellow needles, M.P. 298–300° C. (decomp.).

*Analysis.*—Calcd. for $C_8H_2ON_4S_2$: C, 41.02; H, 0.85; S, 27.37; N, 23.92. Found: C, 41.37; H, 1.03; S, 27.46; N, 23.40.

The infrared spectrum shows absorption at 2.88μ and 2.98μ ($NH_2$), 4.49μ (conjugated CN), 6.02μ (conjugated C=O), 6.25μ and 6.48μ (C=C). The ultraviolet spectrum shows absorption at 345 mμ ($k$=87.1) and a shoulder at 230 mμ ($k$=56.8).

EXAMPLE VII

2-(Cyano-p-Toluenesulfonylmethylene)-4,5-Dicyano-1,3-Dithiolene

Example I is repeated using p-toluenesulfonylacetonitrile instead of malononitrile to give dipotassium 1,1-dimercapto-2-cyano-2-p-toluenesulfonylethylene in 68% of the theoretical yield, a yellow solid, which did not melt but decomposed above about 250° C.

Dipotassium 1,1-dimercapto-2-cyano-2-p-toluenesulfonylethylene is treated with dichlorofumaronitrile according to the procedure of Example II to give 75% of the theoretical yield of a bronze-colored solid, 2-(cyano-p-toluenesulfonylmethylene)-4,5-dicyano-1,3-dithiolene, M.P. 130–145° C. (decomp.). Four crystallizations of this product from chloroform-hexane gave 46% of the theoretical yield of yellow needles, M.P. 141–142° C. (decomp.).

*Analysis.*—Calcd. for $C_{14}H_7O_2N_3S_3$: C, 48.68; H, 2.04; N, 12.15. Found: C, 48.63; H, 2.11; N, 12.26.

The infrared spectrum shows absorption for saturated C—H at 3.1μ, conjugated CN at 4.51μ, aromatic C=C at 6.1μ, and aliphatic C=C at 6.25μ.

Using the procedure set forth in Example II and reactants in essentially 1:1 mol ratio, the 2-methylene-1,3-dithiolenes in Table I can be prepared:

TABLE I
[2-Methylene-1,3-Pithiolenes]

| (1) Example No. | (2) Reactants CX(CN)=CX(CN) | (3) Reactants $(MS)_2C=C\begin{smallmatrix}A\\B\end{smallmatrix}$ | (4) Product $NC-C-S\diagdown\phantom{xx}\diagup A\\\phantom{xxx}C=C\\NC-C-S\diagup\phantom{xx}\diagdown B$ |
|---|---|---|---|
| VIII | CN Cl<br>C=C<br>Cl CN | $(NaS)_2C=C\begin{smallmatrix}CO_2C_2H_5\\CO_2C_2H_5\end{smallmatrix}$ | $NC-C-S\diagdown\diagup CO_2C_2H_5\\NC-C-S\diagup\diagdown CO_2C_2H_5$ |
| IX | Cl Cl<br>C=C<br>CN CN | $(KS)_2C=C\begin{smallmatrix}CO-CH_3\\CO_2C_8H_{17}\end{smallmatrix}$ | $NC-C-S\diagdown\diagup CO-CH_3\\NC-C-S\diagup\diagdown CO_2C_8H_{17}$ |
| X | CN Cl<br>C=C<br>Cl CN | $(NaS)_2C=C\begin{smallmatrix}CO-C_6H_5\\CO_2C_2H_5\end{smallmatrix}$ | $NC-C-S\diagdown\diagup CO-C_6H_5\\NC-C-S\diagup\diagdown CO_2C_2H_5$ |
| XI | CN Cl<br>C=C<br>Cl CN | $(KS)_2C=C\begin{smallmatrix}CO-C_6H_5\\CO-NHC_6H_5\end{smallmatrix}$ | $NC-C-S\diagdown\diagup CO-C_6H_5\\NC-C-S\diagup\diagdown CO-NHC_6H_5$ |
| XII | Cl Cl<br>C=C<br>CN CN | $(KS)_2C=C\begin{smallmatrix}CO-CH_3\\CO-CH_3\end{smallmatrix}$ | $NC-C-S\diagdown\diagup CO-CH_3\\NC-C-S\diagup\diagdown CO-CH_3$ |
| XIII | CN Cl<br>C=C<br>Cl CN | $(NaS)_2C=C\begin{smallmatrix}CO-C_6H_5\\CN\end{smallmatrix}$ | $NC-C-S\diagdown\diagup CO-C_6H_5\\NC-C-S\diagup\diagdown CN$ |
| XIV | CN F<br>C=C<br>F CN | $(NaS)_2C=C\begin{smallmatrix}CO-C_6H_5\\CO-C_6H_5\end{smallmatrix}$ | $NC-C-S\diagdown\diagup CO-C_6H_5\\NC-C-S\diagup\diagdown CO-C_6H_5$ |

TABLE I—Continued
[2-Methylene-1,3-Pithiolenes]—Continued

| (1) Example No. | (2) Reactants $CX(CN)=CX(CN)$ | (3) Reactants $(MS)_2C=C\begin{smallmatrix}A\\B\end{smallmatrix}$ | (4) Product $\begin{smallmatrix}NC-C-S\\ \| \quad \quad \|\\NC-C-S\end{smallmatrix}C=C\begin{smallmatrix}A\\B\end{smallmatrix}$ |
|---|---|---|---|
| XV | CN-C(Br)=C(Br)-CN | $(NaS)_2C=C(SO_2-C_6H_5)_2$ | NC-C-S, SO₂-C₆H₅; NC-C-S, SO₂-C₆H₅ (C=C bridging) |
| XVI | CN-C(Cl)=C(Cl)-CN | $(KS)_2C=C$ with CH=CH-CH=CH (cyclopentadiene) | Product with CH=CH-CH=CH group |
| XVII | CN-C(Cl)=C(Cl)-CN | $(KS)_2C=C$ with -C(=O)-NH-C(=O)-NH- (hydantoin-type) | Corresponding product |
| XVIII | CN-C(Cl)=C(Cl)-CN | $(KS)_2C=C$ (indene) | Corresponding product |
| XIX | CN-C(Cl)=C(Cl)-CN | $(KS)_2C=C$ with -C(=O)-NH-NH-C(=O)- | Corresponding product |
| XX | CN-C(Cl)=C(Cl)-CN | $(KS)_2C=C$ with naphthyl ketone, $CO_2C_2H_5$ | Corresponding product |
| XXI | CN-C(Cl)=C(Cl)-CN | $(KS)_2C=C$ with phthalimide-type O=C-(C₆H₄)-C=O | Corresponding product |
| XXII | CN-C(Cl)=C(Cl)-CN | $(NaS)_2C=C$ with O=C-CH₂-CH₂-C=O (succinyl) | NC-C-S, O=C-CH; C=C, CH₂; NC-C-S, O=C-CH₂ |
| XXIII | CN-C(Cl)=C(Cl)-CN | $(NaS)_2C=C$ with O=C-CH₃, O=C-NHC₂H₅ | Corresponding product |
| XXIV | CN-C(Cl)=C(Cl)-CN | $(NaS)_2C=C$ with O=C-CH₃, O=C-N(C₂H₅)₂ | Corresponding product |
| XXV | CN-C(Cl)=C(Cl)-CN | $(NaS)_2C=C$ with C₆H₅, SO₂-N(CH₃)₂ | Corresponding product |
| XXVI | CN-C(Cl)=C(Cl)-CN | $(NaS)_2C=C$ with SO₂-C₄H₉(n), SO₂-C₄H₉(n) | Corresponding product |

The substituted 2-methylene-4,5-dicyano-1,3-dithiolenes of this invention are useful as ultraviolet light absorbers for the protection of light-sensitive materials from the harmful rays of sunlight.

Thus, in accelerated (Fade-O-Meter) tests, a 1.5 mil thick film of cellulose acetate containing 0.5% by weight of the 2-dicyanomethylene-4,5-dicyano-1,3-dithiolene of Example II (M.P. 203–206° C.) was used as a shield over one-half of a swatch of "Dacron" polyester fabric which had been dyed with a xanthene dye (Rhodamine 3B). After 100 hours of exposure to the ultraviolet light of the Fade-O-Meter, the unshielded portion of the swatch was very badly faded but there was little or no fading in the shielded portion of the fabric. Approximately equivalent results were obtained in similar tests using 2 - (cyanocarboethoxymethylene) - 4,5 - dicyano - 1,3- dithiolene of Example V as the light screening agent. These tests show that small amounts, e.g., 0.1 to 5%, of the substituted 2-methylene-4,5-dicyano-1,3-dithiolenes of this invention are useful for the protection of light-sensitive materials and can be used in various ways such as a shield as illustrated above, as a coating directly on the object, or as a component of the object for which light protection is required. Light-sensitive materials which can be protected in this manner are illustrated by films of regenerated cellulose, cellulose acetate, polyvinyl chloride, ethylene glyco terephthalate polyester resin films, protective coatings including clear varnishes and both dyed and undyed natural and synthetic fibers and fabrics.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. 2-dicyanomethylene-4,5-dicyano-1,3-dithiolene.
2. 2 - (cyanocarboethoxymethylene) - 4,5 - dicyano - 1,3-dithiolene.
3. 2 - (cyanocarboxamidomethylene) - 4,5 - dicyano-1,3-dithiolene.
4. 2 - (cyano - p - toluenesulfonylmethylene) - 4,5 - dicyano-1,3-dithiolene.
5. Compounds of the formula

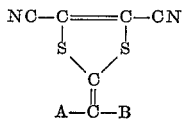

wherein A and B, taken singly, are selected from the class consisting of —CN, —COOR, —SO$_2$R, —SO$_2$NR$_2$, —CONH$_2$, —CONHR, —CONR$_2$ and —COR, R being hydrocarbon free of non-aromatic unsaturation of up to seven carbon atoms; and A and B, taken together, are a divalent radical selected from the class consisting of

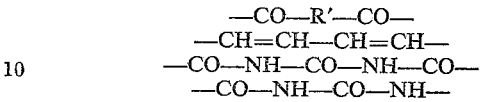

and

R' being divalent hydrocarbon free of non-aromatic unsaturation of up to seven carbon atoms.

References Cited in the file of this patent

UNITED STATES PATENTS 2,493,071   Kendall et al. _____ Jan. 3, 1950

OTHER REFERENCES

Bahr et al.: Chemische Technik, vol. 8, pages 597–8 (1956).